US009373157B2

(12) United States Patent
Numoto

(10) Patent No.: US 9,373,157 B2

(45) Date of Patent: Jun. 21, 2016

(54) DISPLAY CONCEALING SYSTEM

(71) Applicant: PANASONIC INTELLECTUAL PROPERTY MANAGEMENT CO., LTD., Osaka (JP)

(72) Inventor: Tatsuhiko Numoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 51 days.

(21) Appl. No.: 14/585,104

(22) Filed: Dec. 29, 2014

(65) Prior Publication Data

US 2015/0262326 A1 Sep. 17, 2015

(30) Foreign Application Priority Data

Mar. 14, 2014 (JP) ................................ 2014-051517
Nov. 10, 2014 (JP) ................................ 2014-228081

(51) Int. Cl.

*G09G 5/02* (2006.01)
*G06T 3/60* (2006.01)
*G09G 3/00* (2006.01)

(52) U.S. Cl.

CPC *G06T 3/60* (2013.01); *G09G 3/003* (2013.01); *G09G 2358/00* (2013.01)

(58) Field of Classification Search

None

See application file for complete search history.

(56) References Cited

U.S. PATENT DOCUMENTS

2009/0041380 A1* 2/2009 Watanabe ............... G06F 21/84 382/276
2009/0244086 A1* 10/2009 Miyasaka .......... H04N 13/0438 345/589
2009/0323950 A1 12/2009 Nakagata et al.
2010/0085373 A1* 4/2010 Miyasaka ................ G09G 5/00 345/589
2010/0271396 A1* 10/2010 Nemeth .................. G06F 21/84 345/641

(Continued)

FOREIGN PATENT DOCUMENTS

JP 62-295573 A 12/1987
JP 06-110403 A 4/1994
JP 2008-301044 A 12/2008

(Continued)

*Primary Examiner* — Ryan R Yang

(74) *Attorney, Agent, or Firm* — McDermott Will & Emery LLP

(57) ABSTRACT

Provided is a display concealing system capable of forming a concealing image by a simple process of reversing a display position of a normal image. A display concealing system according to the present disclosure includes a display unit configured to display an image, an image forming unit configured to form an image to be displayed on the display unit, and an optical device configured to transmit or cut off the image to be displayed on the display unit. The image forming unit forms a normal image and a concealing image, and sends image data on the normal image and the concealing image to the display unit such that the normal image and the concealing image are synthesized. The optical device transmits the normal image, and cuts off the concealing image. The concealing image is an image that includes reversing sections formed by dividing the normal image at least horizontally or vertically such that each of the reversing sections is formed of a predetermined number of pixels in a state where an array of the pixels is reversed.

9 Claims, 16 Drawing Sheets

(56) References Cited

U.S. PATENT DOCUMENTS

2011/0222559 A1* 9/2011 Ishii ...................... G09G 3/003 370/498
2012/0106779 A1 5/2012 Lee et al.
2014/0085336 A1* 3/2014 Yamamoto .............. G09G 5/00 345/634
2014/0210878 A1* 7/2014 Broughton ............ G09G 3/003 345/694

FOREIGN PATENT DOCUMENTS

JP 2009-229535 A 10/2009
JP 2012-098729 A 5/2012

* cited by examiner

DISPLAY CONCEALING SYSTEM

RELATED APPLICATIONS

These applications claim the benefit of Japanese Application No. 2014-051517, filed on Mar. 14, 2014 and Japanese Application No. 2014-228081, filed on Nov. 10, 2014, the disclosures of which Applications are incorporated by reference herein.

FIELD OF THE INVENTION

The present disclosure relates to a display concealing system which conceals images useful for a user from other persons.

DESCRIPTION OF THE RELATED ART

PTL 1 discloses a portable information processing device which allows viewing of desired images only by a particular user, and simultaneously prohibits viewing of these images by other persons. This information processing device includes memory devices having a memory function and disposed at output parts of a pixel electrode and a first driving element, and a second driving element which simultaneously writes display signals of received output to pixel electrodes of all pixels in a display panel to provide an instantaneous switching type display panel.

CITATION LIST

Patent Literature

PTL 1: Unexamined Japanese Patent Publication No. 06-110403

SUMMARY OF THE INVENTION

The present disclosure provides a display concealing system capable of forming a concealing image by a simple process of reversing a display position of a normal image.

A display concealing system according to the present disclosure includes a display unit configured to display an image, an image forming unit configured to form an image to be displayed on the display unit, and an optical device configured to transmit or cut off the image to be displayed on the display unit. The image forming unit forms a normal image and a concealing image, and sends image data on the normal image and the concealing image to the display unit such that the normal image and the concealing image are synthesized. The optical device transmits the normal image, and cuts off the concealing image. The concealing image is an image that includes reversing sections formed by dividing the normal image at least horizontally or vertically such that each of the reversing sections is formed of a predetermined number of pixels in a state where an array of the pixels is reversed.

The display concealing system according to the present disclosure forms a concealing image by a simple process of reversing a display position of a normal image.

DETAILED DESCRIPTION OF THE PREFERRED EMBODIMENTS

Exemplary embodiments are hereinafter described in detail with reference to the drawings as appropriate. However, unnecessarily detailed description may occasionally be omitted. For example, detailed description of well-known matters and redundant description of substantially the same configurations may occasionally be omitted. The omission of these items is to avoid the following description from becoming unnecessarily redundant, and to ease understanding of those skilled in the art.

Also, it should be noted that the following description and the accompanying drawings are provided to allow any person skilled in the art to fully understand the present disclosure, and that it is not intended to limit the subject matter described in the claims by the following description.

First Exemplary Embodiment

A first exemplary embodiment is hereinafter described with reference to FIG. 1 through FIG. 11.

1-1. Configuration

Figure 1:
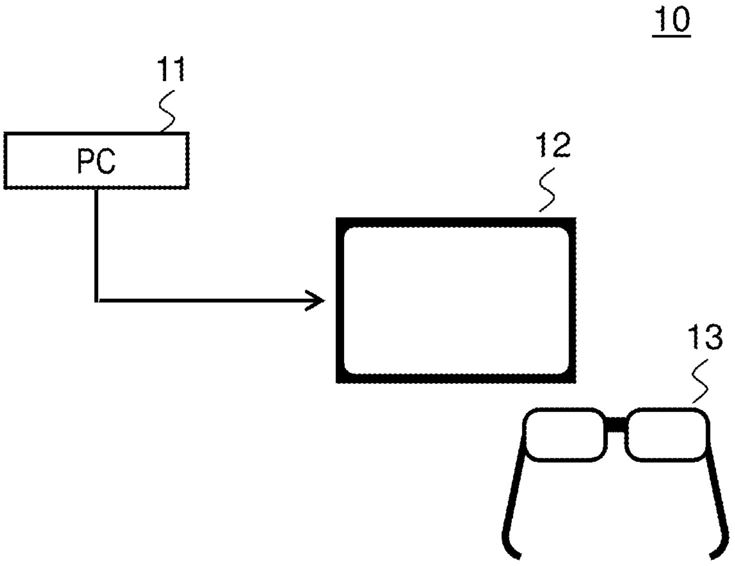
FIG. 1 is a configuration diagram of a display concealing system according to a first exemplary embodiment.

FIG. 1 is a configuration diagram of a display concealing system according to the first exemplary embodiment.

Display concealing system 10 includes personal computer (hereinafter referred to as PC) 11, monitor 12, and glasses 13. PC 11 displays images on monitor 12. A user wearing glasses 13 visually recognizes images displayed on monitor 12 through glasses 13. A person not wearing glasses 13 visually recognizes images displayed on monitor 12 not through glasses 13 but by direct viewing.

Glasses 13 are equipped with an optical device. PC 11 controls glasses 13 via wireless communication or infrared communication. Glasses 13 have two statuses of a transmission status for transmitting images, and a cutoff status for cutting off images, which statuses are controlled by PC 11. More specifically, the two statuses of glasses 13 are realized by the use of a liquid crystal shutter as the optical device. According to display concealing system 10, PC 11 corresponds to an image forming unit, monitor 12 corresponds to a display unit, and glasses 13 correspond to the optical device.

Figure 2:
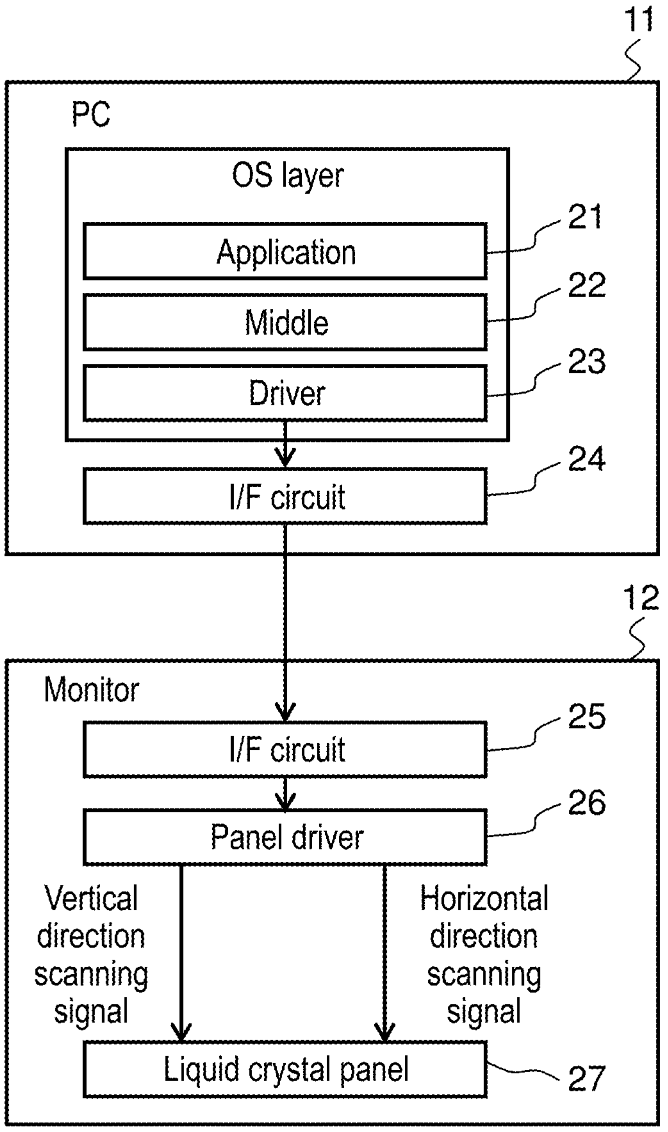
FIG. 2 is a schematic diagram illustrating an operational relationship between a personal computer and a monitor according to the first exemplary embodiment.

Operations of PC 11 and monitor 12 are discussed with reference to FIG. 2. FIG. 2 is a schematic diagram illustrating an operational relationship between PC 11 and monitor 12 according to the first exemplary embodiment.

PC 11 has an OS (Operating System) in operation. OS layers of the OS are constituted by applications 21, middle 22, and driver 23. Applications 21 provide software functions used in display concealing system 10. Middle 22 executes image processing required by applications 21 and other processes on the background. Driver 23 transmits a content resulting from the processing by middle 22 to not-shown hardware of PC 11.

I/F (interface) circuit 24 receives output of data from driver 23, and sends the received data to monitor 12. I/F circuit 25 of monitor 12 receives the data sent from I/F circuit 24. Data transmission and reception between I/F circuit 24 and I/F circuit 25 uses digital transmission standards such as HDMI (High-definition Multimedia Interface) (registered trademark) as a communication interface for transmitting video and audio data via digital signals, and DVI (Digital Visual Interface) as an interface for connecting a computer and a display.

In monitor 12, data received by I/F circuit 25 is sent to panel driver 26, and divided into scanning signals in the vertical direction and scanning signals in the horizontal direction for display operation of monitor 12. Images received from PC 11 are displayed on liquid crystal panel 27 in accordance with operation of liquid crystal panel 27 driven under the scanning signals.

1-2. Operation

Figure 3A:
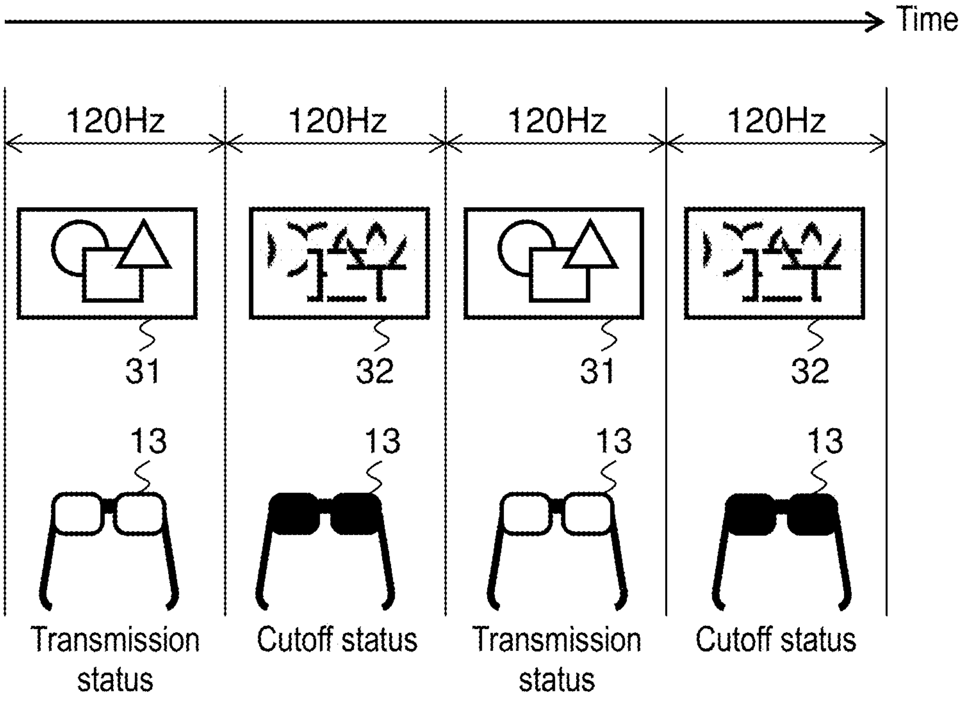
FIG. 3A is a schematic diagram illustrating images displayed on the monitor, and status transition of glasses in time series according to the first exemplary embodiment.
Figure 3B:
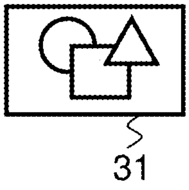
FIG. 3B is a diagram illustrating an example of an image visually recognized by a user wearing the glasses according to the first exemplary embodiment.
Figure 3C:
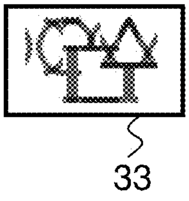
FIG. 3C is a diagram illustrating an example of an image visually recognized by a person not wearing the glasses according to the first exemplary embodiment.

The operation of display concealing system 10 thus constructed is discussed. FIG. 3A is a schematic diagram illustrating images displayed on monitor 12 and status transition of glasses 13 in time series. FIG. 3B is a diagram illustrating an example of an image visually recognized by the user wearing glasses 13. FIG. 3C is a diagram illustrating an example of an image visually recognized by the person not wearing glasses 13.

Monitor 12 alternately displays normal image 31 corresponding to an image desired to be displayed, and concealing image 32 concealing the normal image in accordance with an elapse of time. More specifically, when monitor 12 has liquid crystal panel 27 driven at 120 Hz, PC 11 sends image data to monitor 12 such that normal image 31 and concealing image 32 are switched at intervals of 120 Hz. Similarly, PC 11 sends control signals to glasses 13 such that the two statuses of transmission status and cutoff status of glasses 13 are switched at intervals of 120 Hz. PC 11 controls monitor 12 and glasses 13 such that glasses 13 come into the transmission status when normal image 31 is displayed on monitor 12, and come into the cutoff status when concealing image 32 is displayed on monitor 12.

The user wearing glasses 13 visually recognizes normal image 31 through glasses 13 when glasses 13 are in the transmission status. When the glasses 13 are in the cutoff status, concealing image 32 is cut off by glasses 13. In this condition, concealing image 32 is not visually recognized by the user. As illustrated in FIG. 3B, the user wearing glasses 13 visually recognizes only normal image 31 of the two types of images displayed on monitor 12.

On the other hand, the other person not wearing glasses 13 visually recognizes both normal image 31 and concealing image 32 not cut off by glasses 13. Normal image 31 and concealing image 32 are switched at 120 Hz, in which condition the person not wearing glasses 13 visually recognizes synthesis image 33 as a synthesis image of normal image 31 and concealing image 32 time-synthesized by residual image effect as illustrated in FIG. 3C. The content of normal image 31 is difficult to determine in synthesis image 33. Accordingly, such a condition is realized which only allows visual recognition of normal image 31 by the user wearing glasses 13, and prohibits recognition of the content of normal image 31 by the person not wearing glasses 13.

For concealing images for each of applications 21, concealing image 32 is formed under each of applications 21. For concealing images in the same manner under a plurality of applications, normal images 31 are required to be synchronized between the respective applications. Accordingly, it is preferable that concealing image 32 is formed by middle 22. For constantly concealing images, reduction of processing loads on applications 21 or middle 22 is achievable when concealing image 32 is formed by driver 23.

1-3. Concealing Image Formation Examples

Concealing image formation examples are hereinafter described with reference to FIG. 4A through FIG. 11.

1-3-1. Formation Example 1

Figure 4A:
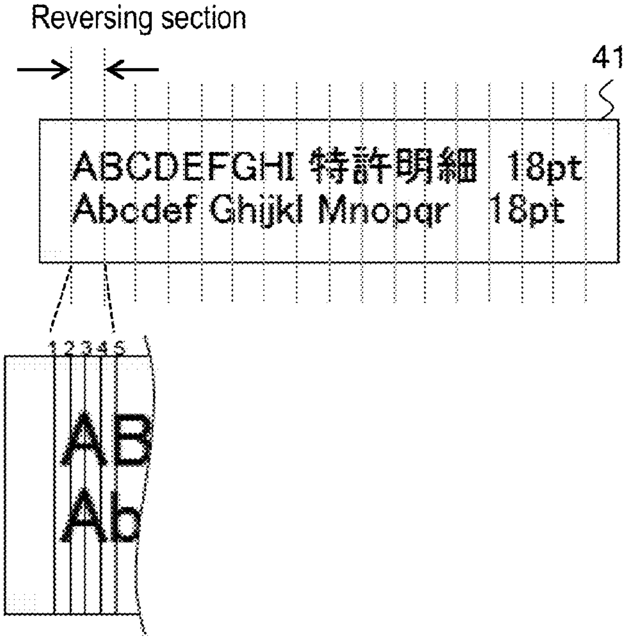
FIG. 4A is a diagram illustrating formation of a concealing image from a normal image according to a concealing image formation example 1.
Figure 4B:
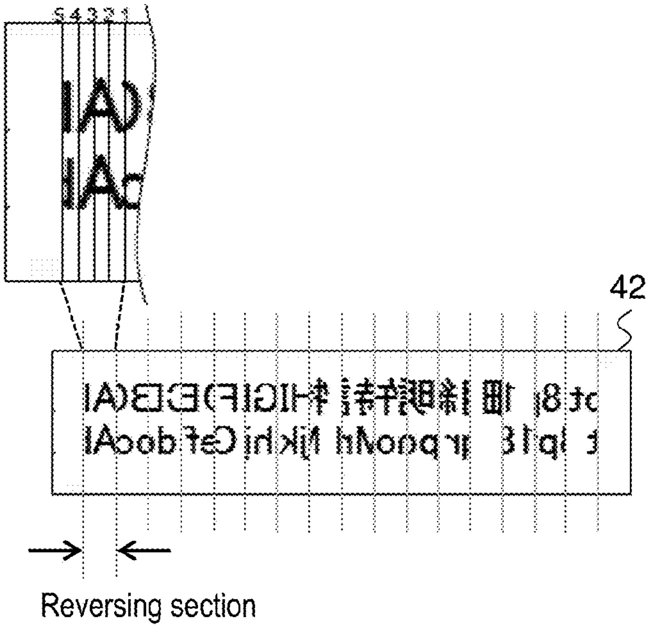
FIG. 4B is a diagram illustrating a formed concealing image according to the concealing image formation example 1.
Figure 4C:
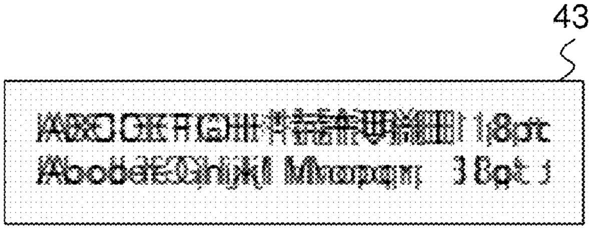
FIG. 4C is a diagram illustrating a synthesis image according to the concealing image formation example 1.

A formation example 1 is discussed with reference to FIG. 4A, FIG. 4B, and FIG. 4C. FIG. 4A is a diagram illustrating formation of a concealing image from a normal image according to the concealing image formation example 1. FIG. 4B is a diagram illustrating the concealing image formed in the concealing image formation example 1. FIG. 4C is a diagram illustrating a synthesis image according to the concealing image formation example 1.

Normal image 41 shown in FIG. 4A includes character information. Normal image 41 is horizontally divided into reversing sections each having a predetermined number of pixels. In FIG. 4A, one reversing section has five pixels. Pixels arranged in the order of 1, 2, 3, 4, and 5 from the left side in each of the reversing sections are reversed in the left-right direction within each section, and rearranged in the order of 5, 4, 3, 2, and 1 from the left side to form concealing image 42 as illustrated in FIG. 4B.

Concealing image 42 is temporally synthesized with normal image 41. As a result, synthesis image 43 shown in FIG. 4C is produced by residual image effect. In synthesis image 43, the content of normal image 41 is extremely difficult to determine.

1-3-2. Formation Example 2

Figure 5:
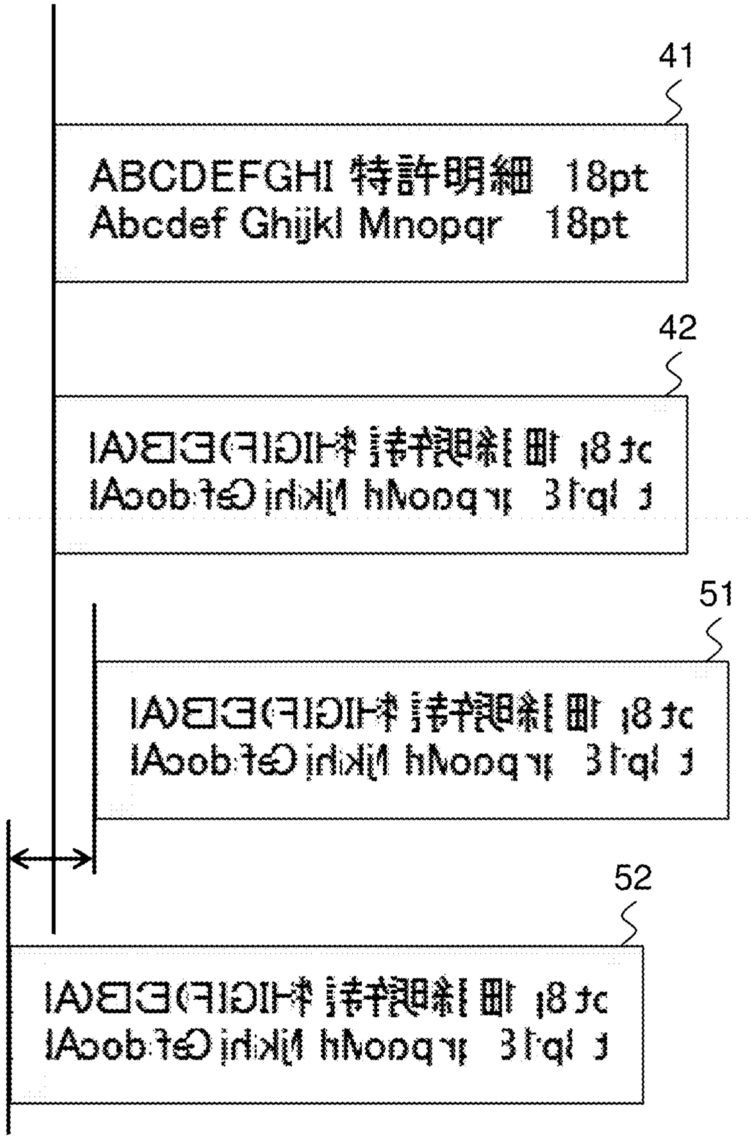
FIG. 5 is a diagram illustrating a concealing image formation example 2.

The formation example 1 has been described on the assumption that the display position of the concealing image is identical to the display position of the normal image. According to a formation example 2, the display position of the concealing image formed in the formation example 1 is shifted in the horizontal direction with respect to the display position of the normal image in accordance with time to increase the degree of concealment. FIG. 5 is a diagram illustrating the concealing image formation example 2.

As illustrated in FIG. 5, first concealing image 51 and second concealing image 52 are formed as concealing images for normal image 41 in addition to concealing image 42 formed in the formation example 1. First concealing image 51 is an image formed by shifting concealing image 42 toward the right in the horizontal direction by a predetermined number of pixels. On the other hand, second concealing image 52 is an image formed by shifting concealing image 42 toward the left in the horizontal direction by a predetermined number of pixels. PC 11 sends image data to monitor 12 such that these images are sequentially switched in the order of normal image 41, concealing image 42, normal image 41, first concealing image 51, normal image 41, concealing image 42, normal image 41, and second concealing image 52.

By shifting the display position of the concealing image in accordance with time with respect to the display position of the normal image, the content of the synthesis image becomes difficult to visually recognize even when the normal image is a still image, for example, rather than an image including character information. Accordingly, the degree of concealment increases.

1-3-3. Formation Example 3

Figure 6:
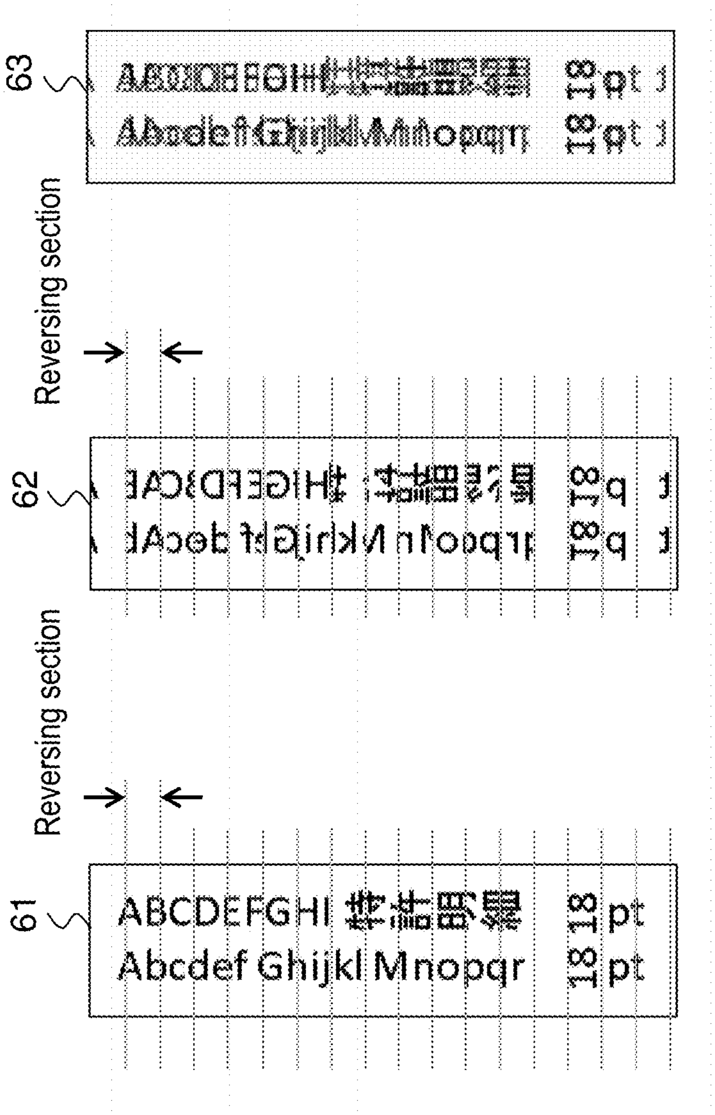
FIG. 6 is a diagram illustrating a concealing image formation example 3.

According to the formation example 1 and the formation example 2, concealment for horizontal-writing character information has been discussed. According to a formation example 3, an example of concealment for vertical-writing characters such as Japanese is discussed. FIG. 6 is a diagram illustrating the concealing image formation example 3. As illustrated in FIG. 6, normal image 61 includes vertical-writing character information.

Normal image 61 is vertically divided into reversing sections each having a predetermined number of pixels. Pixels are reversed in the up-down direction within each of the reversing sections, and rearranged in a different order to form concealing image 62. Concealing image 62 is temporally synthesized with normal image 61. As a result, synthesis image 63 is produced by residual image effect. In synthesis image 63, the content of normal image 61 is extremely difficult to determine.

Accordingly, by determining the direction of the reversing sections based on detection of the continuation direction of characters, the degree of concealment is improved in either case where sentences are written horizontally or vertically in a particular area.

1-3-4. Formation Example 4

Figure 7:
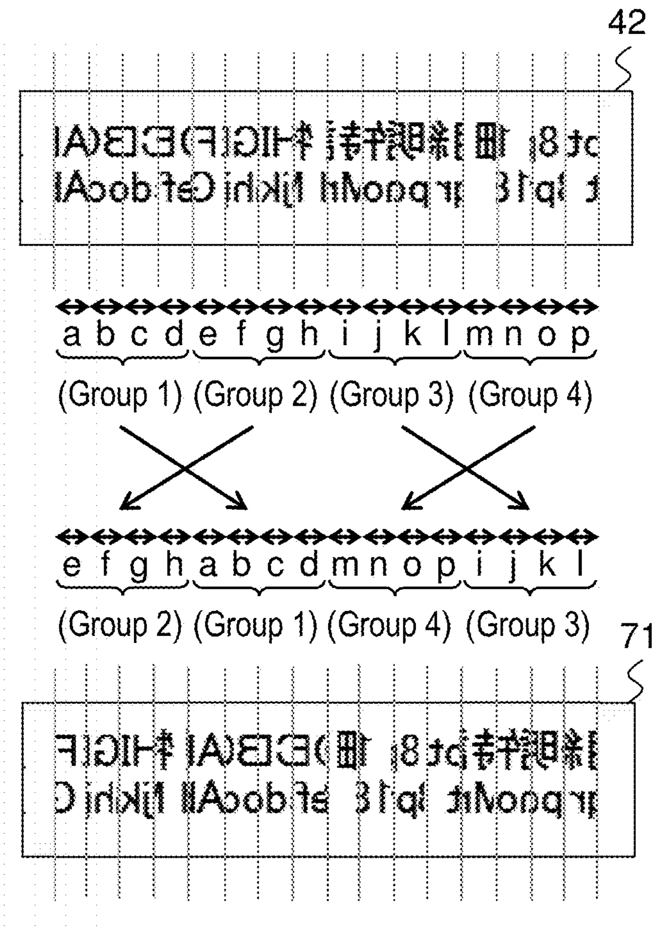
FIG. 7 is a diagram illustrating a concealing image formation example 4.

According to the formation example 2 discussed above, the display position of the concealing image is shifted in the horizontal direction. FIG. 7 is a diagram illustrating a concealing image formation example 4. According to the formation example 4, the order of reversing sections of the concealing image formed in the formation example 1 is switched for every plural reversing sections.

As illustrated in FIG. 7, reversing sections a through p constituting concealing image 42 are arranged in an alphabetical order. Assuming that the reversing sections a through d, e through h, i through l, and m through p are grouped into a group 1, a group 2, a group 3, and a group 4, respectively, the order of the group 1 and the group 2, and the order of the group 3 and the group 4 are switched from the corresponding orders of concealing image 42 to form third concealing image 71. The method of replacing the orders of the reversing sections is not limited to this method. For example, the order of the group 1 and the group 4, and the order of the group 2 and the group 3 may be switched. Alternatively, the order of the reversing sections may be randomly switched rather than switched by the unit of groups.

PC 11 may change a formed concealing image to a different concealing image at intervals of 120 Hz, or other intervals such as once per second. In this case, the degree of concealment improves without excessively increasing the volume of processing.

1-3-5. Formation Example 5

Figure 8:
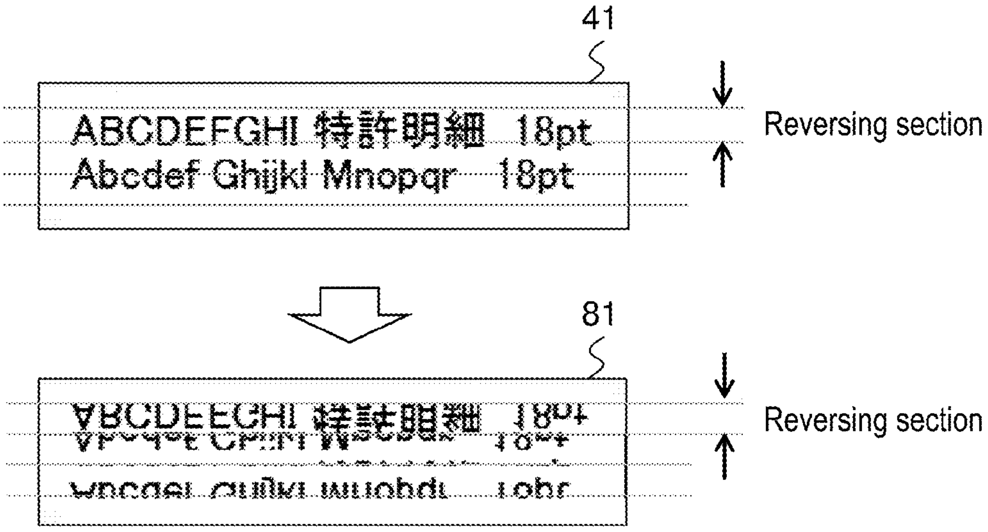
FIG. 8 is a diagram illustrating a concealing image formation example 5.

According to the formation example 1 discussed above, normal image 41 is horizontally divided into reversing sections, and the reversing sections are reversed in the left-right direction within each reversing section to form concealing image 42. According to a formation example 5 to be discussed herein, the normal image is vertically divided into reversing sections, and a concealing image including these reversing sections is formed as well as concealing image 42. FIG. 8 is a diagram illustrating the concealing image formation example 5.

As illustrated in FIG. 8, normal image 41 is vertically divided into reversing sections each having a predetermined number of pixels. Pixels are reversed in the up-down direction within each of the reversing sections, and the order of the pixels is switched to form fourth concealing image 81. PC 11 sends image data to monitor 12 such that these images are switched in the order of normal image 41, concealing image 42, normal image 41, and fourth concealing image 81, for example. Concealing image 42, fourth concealing image 81, and normal image 41 are temporally synthesized with each other. In this case, the residual image effect further increases in comparison with the formation example 1. Accordingly, the degree of concealment further improves.

1-3-6. Formation Example 6

Figure 9:
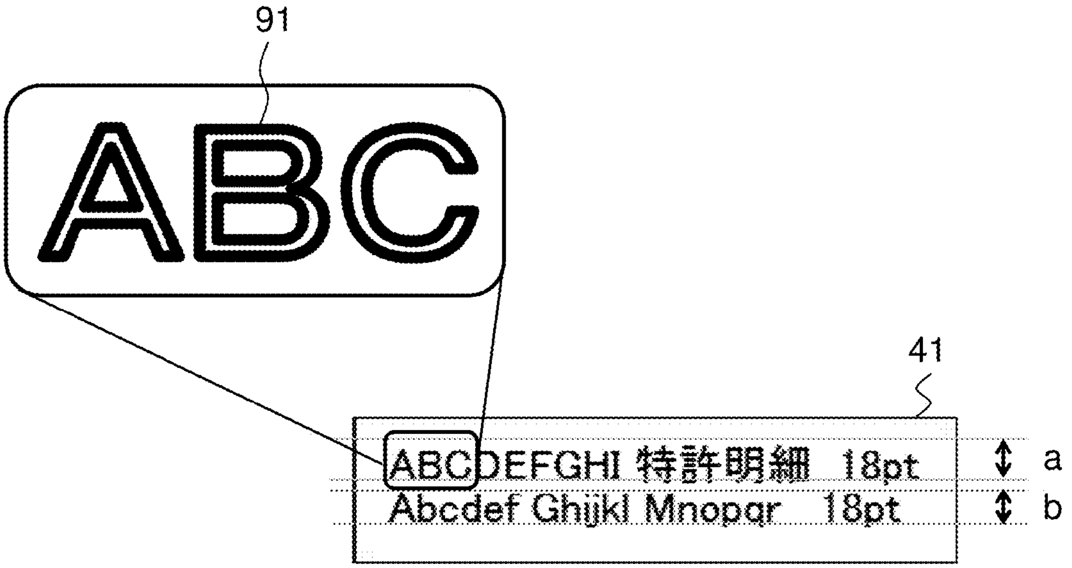
FIG. 9 is a diagram illustrating detection of a character size included in the normal image according to a concealing image formation example 6.

According to a formation example 6 to be discussed herein, the number of pixels in each reversing section is determined in accordance with the size of characters included in the normal image to form a concealing image. FIG. 9 is a diagram illustrating detection of the character size included in the normal image according to the concealing image formation example 6.

The method for determining the size of the characters included in the normal image is explained. In general, there is a certain difference in brightness between a character and a background. Thus, edge portions within an image are detected based on calculation of an area where the brightness of adjoining pixels indicates a predetermined threshold or higher. According to the formation example 6, the edge portions are regarded as parts of characters. As illustrated in FIG. 9, edge portions 91 of characters “ABC” are detected as portions indicated in an enlarged illustration of a part of normal image 41. The distribution of brightness of pixels within normal image 41 in the horizontal direction or the vertical direction is detected based on detected edge portions 91. As can be seen from FIG. 9, a number of edge portions 91 are distributed in area a and area b in the vertical direction. Accordingly, the character size is determined based on the directions and widths of the characters in area a and area b.

Figure 10:
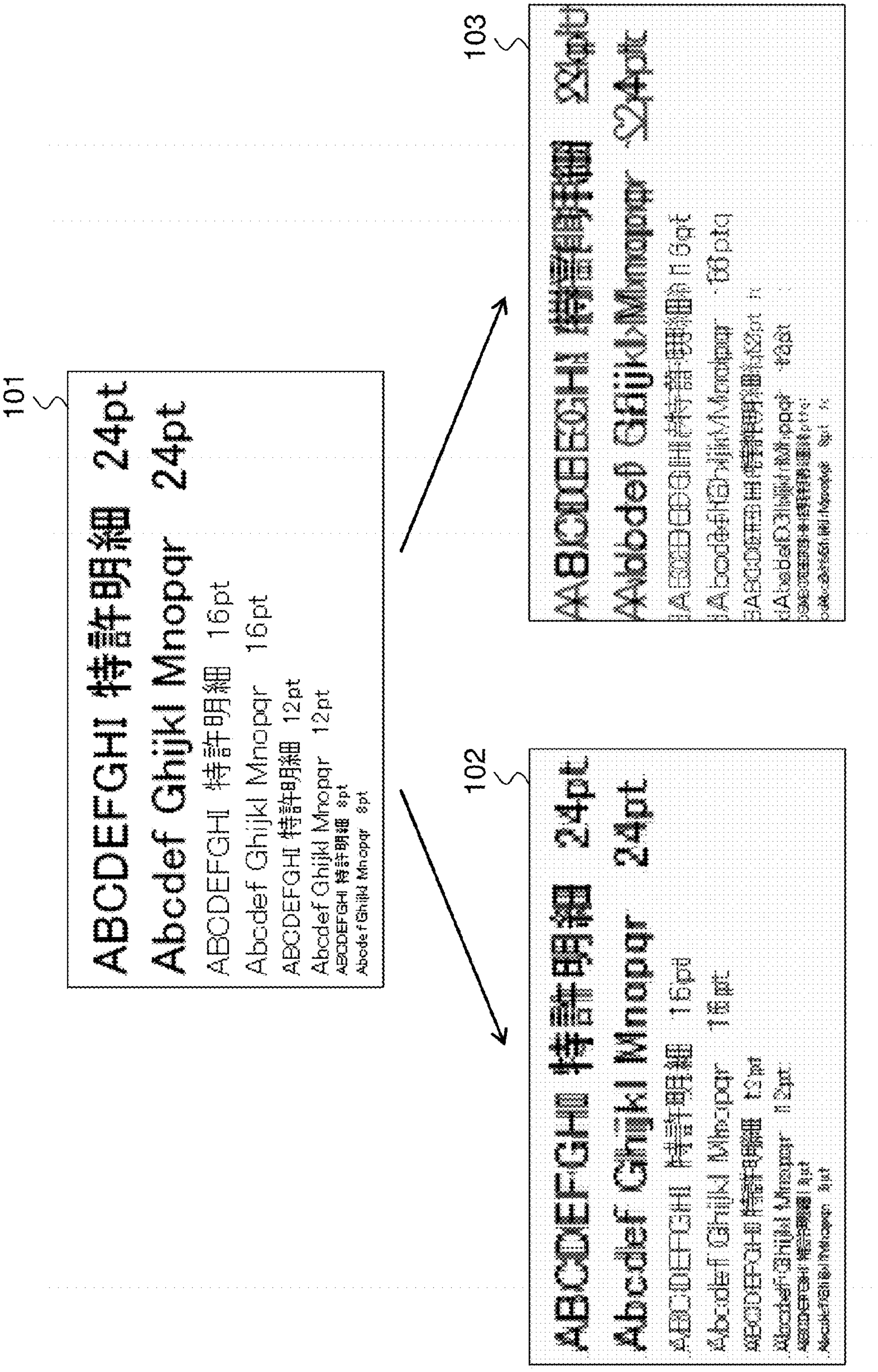
FIG. 10 is a diagram illustrating character sizes and reversing sections of the normal image according to the concealing image formation example 6.

FIG. 10 is a diagram illustrating character sizes and reversing sections of a normal image according to the concealing image formation example 6.

FIG. 10 illustrates synthesis image 102 formed by synthesizing normal image 101 with a concealing image which includes horizontally reversed reversing sections each having the number of pixels corresponding to a size 0.25 times as large as the maximum character size included in normal image 101. In addition, FIG. 10 illustrates synthesis image 103 formed by synthesizing normal image 101 with a concealing image which includes horizontally reversed reversing sections each having the number of pixels corresponding to the maximum character size included in normal image 101. As can be seen from FIG. 10, synthesis image 103 exhibits a higher degree of concealment. Accordingly, it is understood that narrower reversing sections are not necessarily preferable.

Normal image 101 is synthesized with each of concealing images which include horizontally reversed reversing sections each having the number of pixels corresponding to sizes in the range from 0.25 to 1.25 times as large as the maximum character size. By checking synthesis images thus formed, it has been confirmed that a suitable concealing image includes horizontally reversed reversing sections each having the number of pixels corresponding to sizes in the range from 0.5 to 1.2 times as large as the maximum character size included in normal image 101, more preferably, in the range from 0.9 to 1 time as large as the maximum character size included in normal image 101.

According to this example, the edge portions are detected from the normal image, and the maximum character size is determined based on the detected edge portions regarded as a part of characters. Then, such a concealing image is formed which includes horizontally reversed reversing sections having the number of pixels corresponding to sizes in the range from 0.5 to 1.2 times as large as the maximum character size. This method eliminates the necessity of executing complicated calculations such as character recognition. Accordingly, an image allowing a high degree of concealment is formed only by a simple process of numerical comparison. It is preferable that the reversing sections are established in the horizontal direction for horizontal writing, and established in the vertical direction for vertical writing.

1-3-7. Formation Example 7

Figure 11:
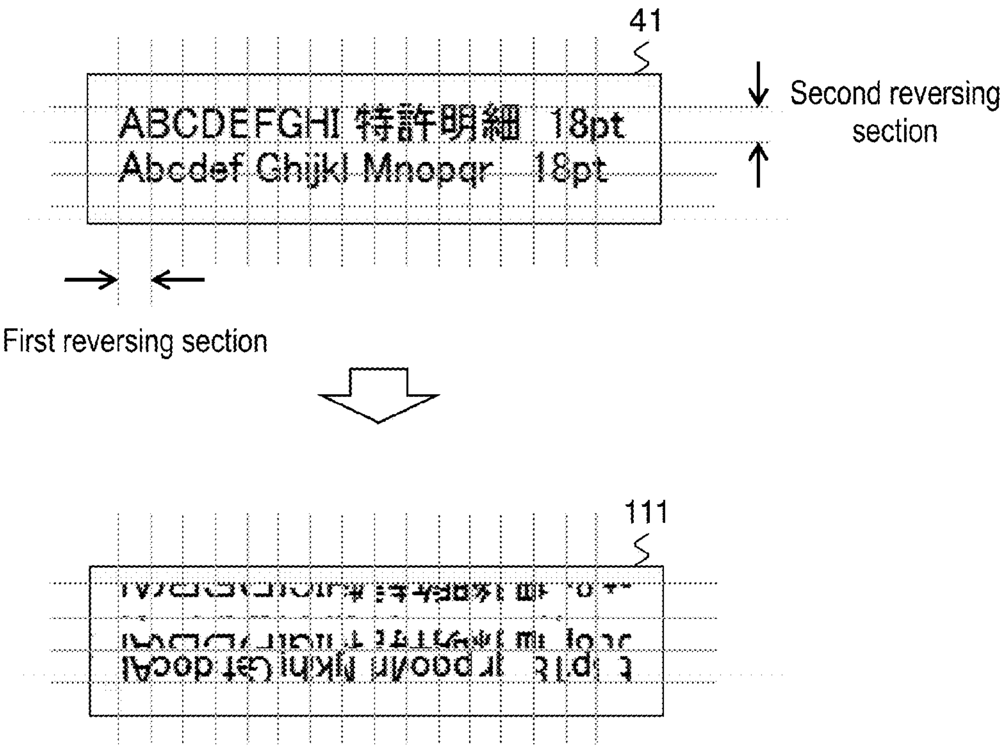
FIG. 11 is a diagram illustrating a concealing image formation example 7.

According to a formation example 7 to be discussed herein, reversing sections are formed both in the horizontal direction and the vertical direction. FIG. 11 is a diagram illustrating the concealing image formation example 7. As illustrated in FIG. 11, normal image 41 is horizontally divided into first reversing sections each having a predetermined number of pixels and reversed in the left-right direction for each, and further vertically divided into second reversing sections each having a predetermined number of pixels and reversed in the up-down direction for each to form fifth concealing image 111.

In this case, the number of pixels in each of the first reversing sections and the second reversing sections may be arbitrarily determined, or may be determined based on detection of the maximum character size. Alternatively, instead of the reversion in the up-down and left-right directions, the number of pixels may be equalized for each of the first reversing sections and the second reversing sections, i.e., each of the reversing sections may be set to a square reversing section, and the square reversing sections may be rotated through 90°, 180°, or 270°.

PC 11 sends image data to monitor 12 such that these images are switched in the order of normal image 41, fifth concealing image 111, normal image 41, and a concealing image rotated through 180°, for example. In this case, such a concealing image is formed which includes reversing sections divided in two directions. As a result, the content of the concealing image thus formed becomes considerably different from the content of normal image 41, whereby the degree of concealment improves.

1-4. Effects

A display concealing system according to the present disclosure includes a display unit configured to display an image, an image forming unit configured to form an image to be displayed on the display unit, and an optical device configured to transmit or cut off the image to be displayed on the display unit. The image forming unit forms a normal image and a concealing image, and sends image data on the normal image and the concealing image to the display unit such that the normal image and the concealing image are synthesized. The optical device transmits the normal image, and cuts off the concealing image. The concealing image is an image that includes reversing sections formed by dividing the normal image at least horizontally or vertically such that each of the reversing sections is formed of a predetermined number of pixels in a state where an array of the pixels is reversed. Moreover, the image forming unit sends the image data to the display unit such that the normal image and the concealing image are temporally synthesized.

This configuration allows formation of a concealing image from a normal image based on simplified rules. Accordingly, this configuration provides a display concealing system capable of reducing processing loads on PC 11, and only allowing visual recognition of a normal image by a user wearing glasses while prohibiting visual recognition of the normal image by a person not wearing the glasses.

The image forming unit of the display concealing system according to the present disclosure further forms a second concealing image. The second concealing image is an image formed by horizontally or vertically shifting a display position of the concealing image by a predetermined number of pixels. The image forming unit sends image data on the normal image, the concealing image, and the second concealing image to the display unit such that the normal image, the concealing image, and the second concealing image are synthesized. The optical device transmits the normal image, and cuts off the concealing image and the second concealing image.

This configuration increases the degree of concealment for the normal image even when the normal image is a still image rather than an image including character information.

The image forming unit of the display concealing system according to the present disclosure detects whether characters included in the normal image are written vertically or horizontally. When the characters are written horizontally, the image forming unit forms the concealing image by using an image that includes reversing sections formed by horizontally dividing the normal image such that each of the reversing sections formed of a predetermined number of pixels in a state where the array of the pixels is reversed. When the characters are written vertically, the image forming unit forms the concealing image by using an image that includes reversing sections formed by vertically dividing the normal image such that having of a predetermined number of pixels in a state where the array of the pixels is reversed.

This configuration forms a suitable concealing image based on determination whether the characters of the normal image are written vertically or horizontally, allowing improvement of the degree of concealment.

The concealing image of the display concealing system according to the present disclosure is an image where images are replaced with each other for every plural reversing sections.

This configuration increases the degree of concealment without greatly changing the volume of processing.

The image forming unit of the display concealing system according to the present disclosure detects edge portions of the normal image, estimates a size of characters included in the normal image based on distribution of the edge portions, and forms the concealing image by varying the number of pixels within the reversing sections in accordance with the size of the characters.

This configuration forms a concealing image in accordance with the size of the characters of the normal image, allowing improvement of the degree of concealment.

Second Exemplary Embodiment

A second exemplary embodiment is hereinafter described with reference to FIG. 12A, FIG. 12B, FIG. 12C, and FIG. 13. Chiefly discussed in the following description of this exemplary embodiment are differences from the first exemplary embodiment, and the same explanation is not repeated.

2-1. Configuration

A display concealing system according to the second exemplary embodiment has a configuration identical to the configuration discussed in the first exemplary embodiment in conjunction with FIG. 1. In addition, the operations of PC 11 and monitor 12 are identical to the corresponding operations in the first exemplary embodiment discussed in conjunction with the figures.

2-2. Operation

According to the first exemplary embodiment, concealing image 32 displayed on monitor 12 has been discussed as an image for concealing normal image 31. In the first exemplary embodiment, such a condition is realized which allows the user wearing the glasses to visually recognize normal image 31, and allows the person not wearing the glasses to visually recognize synthesis image 33 which prohibits recognition of the content of normal image 31 by the person. According to the second exemplary embodiment, a different type of image is inserted as well as concealing image 32 so as to further increase the degree of concealment.

Figure 12A:
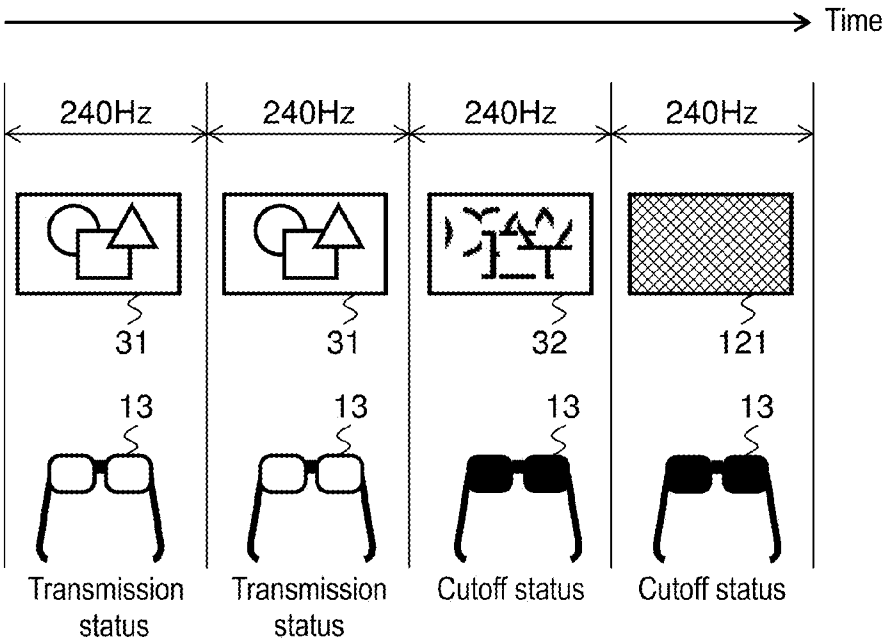
FIG. 12A is a schematic diagram illustrating images displayed on a monitor and operation of glasses according to a second exemplary embodiment.
Figure 12B:
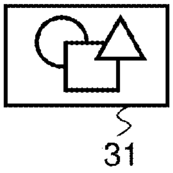
FIG. 12B is a diagram illustrating an example of an image visually recognized by a user wearing the glasses according to the second exemplary embodiment.
Figure 12C:
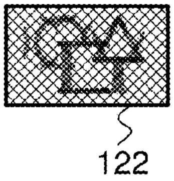
FIG. 12C is a diagram illustrating an example of an image visually recognized by a person not wearing the glasses according to the second exemplary embodiment.

FIG. 12A is a schematic diagram illustrating images to be displayed, and status transition of glasses 13 in time series. FIG. 12B is a diagram illustrating an example of an image to be visually recognized by the user wearing glasses 13. FIG. 12C is a diagram illustrating an example of an image to be visually recognized by the person not wearing glasses 13.

Monitor 12 sequentially displays normal image 31 desired to be displayed, and concealing image 32 and pattern image 121 for concealing normal image 31 in accordance with an elapse of time. Pattern image 121 is an image constituted by patterns having particular frequency components. More specifically, when monitor 12 includes liquid crystal panel 27 operating at 240 Hz, PC 11 sends image data to monitor 12 such that normal image 31, concealing image 32, and pattern image 121 are switched at intervals of 240 Hz. According to a specific example, images are switched such that normal image 31 is displayed for every two cycles of 240 Hz, i.e., at intervals of 120 Hz, and that concealing image 32 and pattern image 121 are displayed at intervals of 240 Hz, respectively, so as to avoid lowering of luminance of normal image 31. The images may be displayed in the order of normal image 31, concealing image 32, normal image 31, and pattern image 121.

Similarly, PC 11 sends control signals to glasses 13 such that the status of glasses 13 is also switched between two statuses of the transmission status and the cutoff status at 240 HZ. PC 11 controls monitor 12 and glasses 13 such that glasses 13 come into the transmission status when normal image 31 is displayed on monitor 12, and come into the cutoff status when concealing image 32 or pattern image 121 is displayed on monitor 12.

The user wearing glasses 13 visually recognizes normal image 31 through glasses 13 when glasses 13 are in the transmission status. When glasses 13 are in the cutoff status, concealing image 32 and pattern image 121 are cut off by glasses 13. As a result, concealing image 32 and pattern image 121 are not visually recognized by the user. As illustrated in FIG. 12B, the user wearing glasses 13 is allowed to visually recognize only normal image 31 of the images displayed on monitor 12.

On the other hand, the person not wearing glasses 13 visually recognizes all of normal image 31, concealing image 32, and pattern image 121. Normal image 31, concealing image 32, and pattern image 121 are switched at intervals of 240 Hz, whereby the person not wearing glasses 13 visually recognizes synthesis image 122 as a synthesis image of normal image 31, concealing image 32, and pattern image 121 time-synthesized by residual image effect as illustrated in FIG. 12C. The content of normal image 31 is difficult to determine in synthesis image 122, whereby such a condition is realized which allows visual recognition of normal image 31 only by the user wearing glasses 13, and prohibits visual recognition of the content of normal image 31 by the person not wearing glasses 31. Unlike synthesis image 33 formed in the first exemplary embodiment, an image having particular frequency components is additionally superimposed according to this exemplary embodiment. Accordingly, the degree of concealment further increases.

2-3. Pattern Image Formation Examples

The details of pattern image 121 are herein discussed. Pattern image 121 is an image constituted by patterns having particular frequency components. The frequency in this context refers to a repetition frequency of patterns in the horizontal direction or the vertical direction of an image. Characters are produced by particular numbers of pixels. Accordingly, the concealment of synthesis image 122 securely increases when the repetition frequency of patterns is determined such that patterns are repeated at intervals similar to the particular pixel numbers of characters.

2-3-1. Formation Example 1

The pattern image is not required to have uniform patterns throughout monitor 12. Discussed herein is an example of a pattern image including non-uniform patterns.

Figure 13:
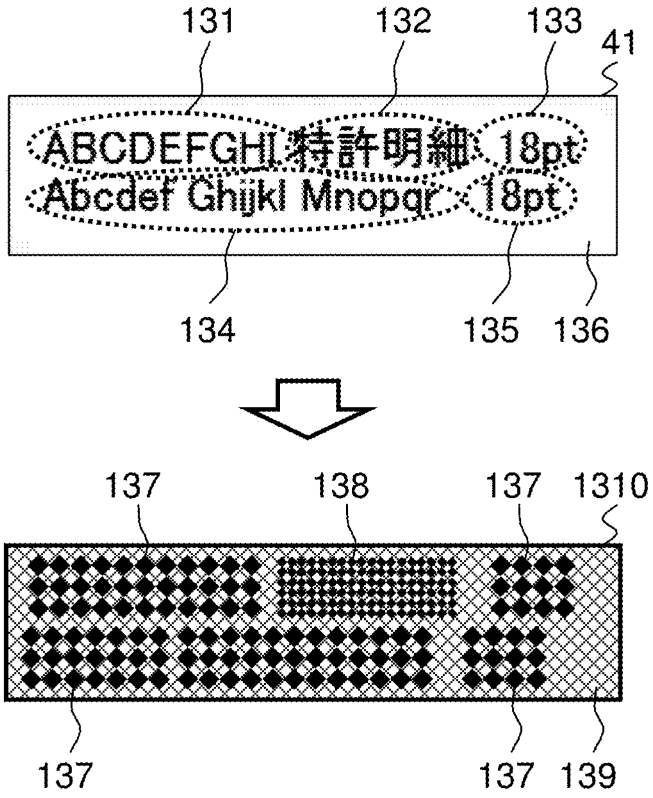
FIG. 13 is a schematic diagram illustrating a pattern image formation example.

FIG. 13 is a diagram illustrating a pattern image formation example. As illustrated in FIG. 13, edge portions are detected from normal image 41. Spatial frequencies of characters included in normal image 41 are calculated from the detected edge portions. Accurate calculation of spatial frequencies of characters considerably increases the processing volume. Accordingly, three levels of areas constituted by an area of a high spatial frequency including Chinese characters of Japanese or the like, an area of a low spatial frequency including alphanumeric characters, katakana of Japanese or the like, and an area of an extremely low spatial frequency including only blanks, grid-lines or the like. For example, areas 131, 133, 134, and 135 in normal image 41 in FIG. 13 correspond to the area of a low spatial frequency, area 132 corresponds to the area of a high spatial frequency, and area 136 corresponds to the area of an extremely low spatial frequency.

Patterns to be used are varied in accordance with the levels of spatial frequencies. More specifically, first pattern 137 having a low spatial frequency is provided at positions corresponding to areas 131, 133, 134, and 135, second pattern 138 having a high spatial frequency is provided at a position corresponding to area 132, and third pattern 139 having an extremely low spatial frequency is provided at a position corresponding to area 136 to form pattern first image 1310. This configuration increases the degree of concealment.

Patterns provided in area 136 having an extremely low spatial frequency may be eliminated.

2-4. Effects

The image forming unit of the display concealing system according to the present disclosure further forms a pattern image including patterns having particular frequency components, and sends image data on the normal image, the concealing image, and the pattern image to the display unit such that the normal image, the concealing image, and the pattern image are temporally synthesized.

The image forming unit of the display concealing system according to the present disclosure detects edge portions of the normal image, and varies frequency components of the patterns in accordance with a frequency of an area including characters included in the normal image based on distribution of the edge portions, to form the pattern image.

This configuration allows the person not wearing the glasses to visually recognize only a synthesis image further complicated in comparison with the first exemplary embodiment. Accordingly, the degree of concealment of the normal image securely improves.

Third Exemplary Embodiment

A third exemplary embodiment is hereinafter described with reference to FIG. 14 and FIG. 15.

3-1. Configuration

According to the first and second exemplary embodiments discussed above, the degree of concealment of the normal image is increased by temporal-synthesis of the normal image and the concealing image using frame sequential system. According to this exemplary embodiment to be discussed herein, the normal image and the concealing image are spatially synthesized.

Figure 14:
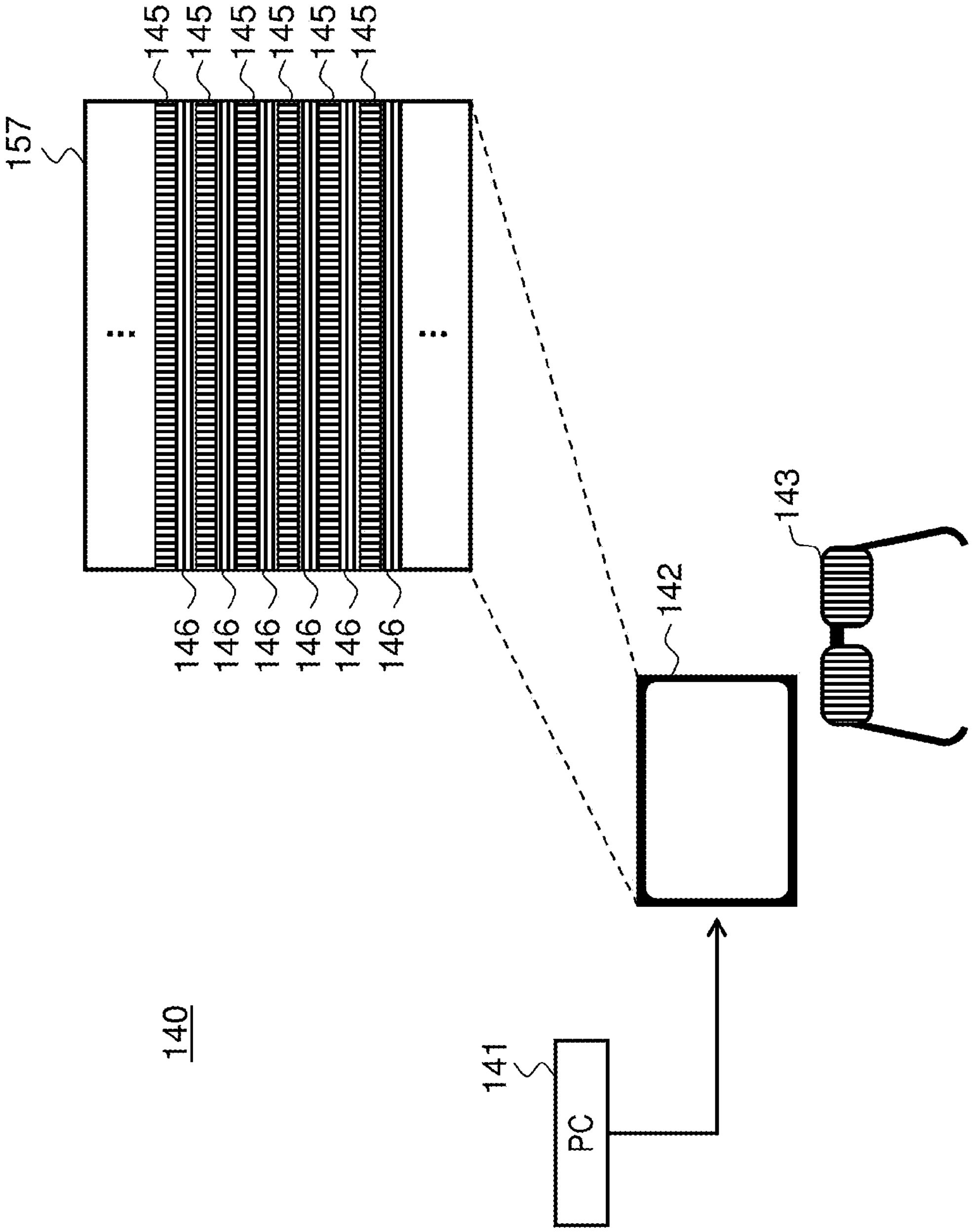
FIG. 14 is a configuration diagram of a display concealing system according to a third exemplary embodiment.
Figure 15:
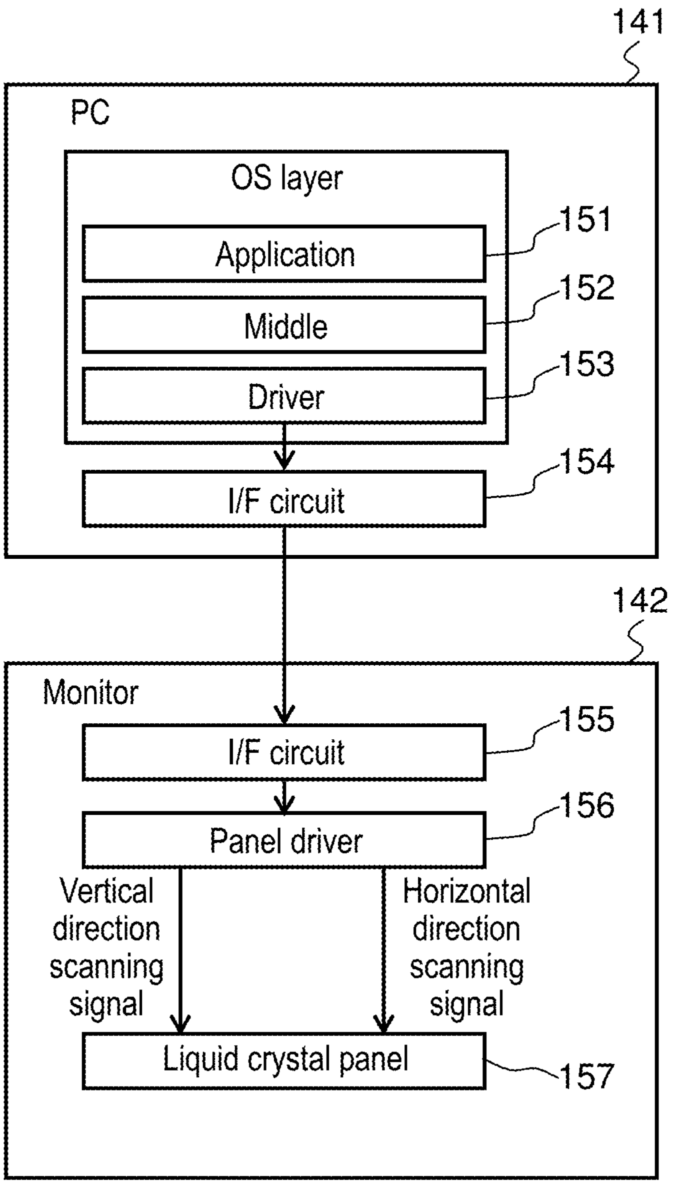
FIG. 15 is a schematic diagram illustrating an operational relationship between a personal computer and a monitor according to the third exemplary embodiment.

FIG. 14 is a configuration diagram of a display concealing system according to the third exemplary embodiment.

Display concealing system 140 includes PC 141, monitor 142, and glasses 143. PC 141 allows display of images on monitor 142. A user wearing glasses 143 visually recognizes images displayed on monitor 142 through glasses 143. A person not wearing glasses 143 visually recognizes images on monitor 142 not through glasses 143 but by direct viewing.

The operations of PC 141 and monitor 142 are explained with reference to FIG. 15. FIG. 15 is a schematic diagram illustrating an operational relationship between PC 141 and monitor 142 according to this exemplary embodiment.

PC 141 has an OS (Operating System) in operation. OS layers of the OS are constituted by applications 151, middle 152, and driver 153. Applications 151 provide software functions used by the user. Middle 152 executes image processing required by applications 151 and other processes on the background. Driver 153 sends a content resulting from the processing by middle 152 to not-shown hardware of PC 141.

I/F circuit 154 receives output of data from driver 153, and sends the received data to monitor 142. I/F circuit 155 of monitor 142 receives the data sent from I/F circuit 154. Data transmission and reception between I/F circuit 154 and I/F circuit 155 is allowed by the use of digital transmission standards such as HDMI (registered trademark) as a communication interface for transmitting video and audio data as digital signals, and DVI as an interface for connecting a computer and a display.

In monitor 142, data received by I/F circuit 155 is sent to panel driver 156, and divided into scanning signals in the vertical direction and scanning signals in the horizontal direction to allow display operation of monitor 142. Images received from PC 141 are displayed on liquid crystal panel 157 in accordance with operation of liquid crystal panel 157 driven under the scanning signals.

Liquid crystal panel 157 is configured to simultaneously display normal image 31 and concealing image 32 by switching normal image 31 and concealing image 32 for each display line. More specifically, as illustrated in FIG. 14, polarization conversion film 145 for converting incident light into light having a first polarization direction is provided at positions corresponding to odd lines of the surface of liquid crystal panel 157, while polarization conversion film 146 for converting incident light into light having a second polarization direction is provided at positions corresponding to even lines of liquid crystal panel 157. PC 141 sends image data on both images 31 and 32 to monitor 142 such that normal images 31 are displayed on the odd lines of liquid crystal panel 157, and that concealing images 32 are displayed on the even lines of liquid crystal panel 157.

Films capable of transmitting light having the first polarization direction are provided for both eyes of glasses 143.

The user wearing glasses 143 is allowed to visually recognize only normal image 31. On the other hand, the person not wearing glasses 143 visually recognizes both normal image 31 and concealing image 32. In this case, the content of normal image 31 is difficult to determine.

According to display concealing system 140, PC 141 corresponds to an image forming unit, monitor 142 corresponds to a display unit, and glasses 143 corresponds to an optical device.

3-2. Synthesis Image

Figure 16:
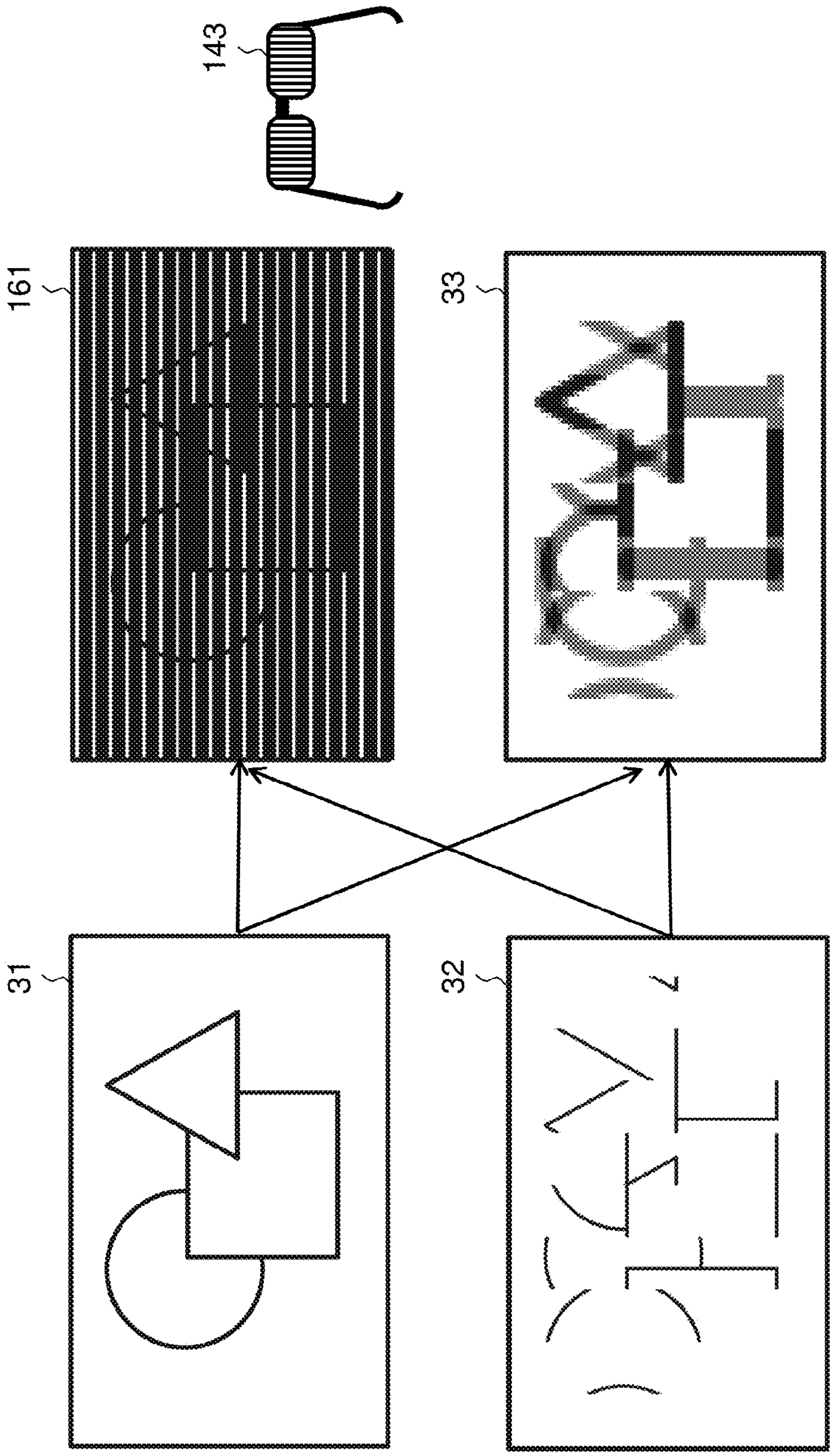
FIG. 16 is a diagram illustrating an example of an image visually recognized by a user wearing glasses, and an example of an image visually recognized by a person not wearing the glasses according to the third exemplary embodiment.

FIG. 16 is a diagram illustrating an example of a synthesis image visually recognized by the user wearing glasses 143, and an example of a synthesis image visually recognized by the person not wearing glasses 143 according to the third exemplary embodiment. As illustrated in FIG. 16, normal image 31 is displayed on the odd lines of liquid crystal panel 157, while concealing image 32 is displayed on the even lines of liquid crystal panel 157. Synthesis image 161 is an image visually recognized by the user wearing glasses 143.

Normal image 31 on the odd lines is converted into light having the first polarization direction by polarization conversion film 145 provided on the surface of liquid crystal panel 157, and passes through glasses 143. On the other hand, concealing image 32 on the even lines is converted into light having the second polarization direction different from the first polarization direction by polarization conversion film 146 provided on the surface of liquid crystal panel 157, and therefore cut off by glasses 143. Accordingly, synthesis image 161 including dark lines on the even lines is visually recognized through glasses 143. However, the line for one pixel on the one even line in synthesis image 161 is extremely thin in comparison with a normal monitor size, whereby synthesis image 161 is visually recognized as a dark image on the whole, having 50% of luminance of the image entirely displayed.

On the other hand, the person not wearing glasses 143 visually recognizes a synthesis image including display of normal image 31 on the odd lines, and concealing image 32 on the even lines. The synthesis image including alternate display of normal image 31 and concealing image 32 pixel by pixel is visually recognized as an image equivalent to synthesis image 33 temporally synthesized for the person not wearing glasses 143.

Accordingly, even when normal image 31 and concealing image 32 are spatially synthesized using polarization directions, normal image 31 is allowed to be concealed similarly to the case of temporal-synthesis by frame sequential system.

Two polarization conversion films 145 and 146 may be provided for each horizontal scanning line, i.e., pixel by pixel as discussed above, or may be provided for every plural pixels of the horizontal scanning lines. The first polarization direction and the second polarization direction may be circular polarization directions having different directions of circulation, or may be linear polarization directions perpendicular to each other.

According to this exemplary embodiment discussed herein, the polarization films transmitting light having a particular polarization direction are provided on glasses 143. However, glasses 143 may be equipped with an optical device constituted by a liquid crystal shutter. The polarization directions are not limited to the aforementioned directions, but may be determined otherwise as long as light of concealing image 32 is cut from pixels displaying the concealing image 32 by the monitor and the glasses.

Furthermore, the concealing image may be any one of the concealing images shown in the formation example 1 through the formation example 7 discussed in the first exemplary embodiment.

3-3. Effects

The image forming unit of the display concealing system according to the present disclosure sends the image data to the display unit such that the normal image and the concealing image are spatially synthesized.

According to this configuration, the normal image and the concealing image are alternately provided for each scanning line, in which condition pixels having no correlation are alternately provided for each scanning line. Accordingly, the normal image is difficult to visually recognize for the person not wearing the glasses.

In addition, when an image is shot by a camera at the time of display of the normal image on the monitor according to the first and second exemplary embodiments, there is a possibility that only the normal image is shot. According to this exemplary embodiment of the present disclosure, however, only a visually unrecognizable image is shot on the monitor at any time. Accordingly, the risk of secret shooting of the normal image decreases.

Other Exemplary Embodiments

The first through third exemplary embodiments have been described as examples of the display concealing system of the present disclosure. However, the present disclosure is not limited to these exemplary embodiments, but may be applied to other exemplary embodiments including changes, replacements, additions, omissions and the like. Moreover, the constituent elements included in the first through third exemplary embodiments discussed herein may be combined to present new exemplary embodiments.

The followings are other exemplary embodiments of the present disclosure.

(A) According to the second exemplary embodiment, the pattern image is used in addition to the concealing image. However, rather than using both the concealing image and the pattern image, the concealing image may be constituted by the pattern image formed by varying contained patterns in accordance with the levels of the spatial frequencies discussed in the second exemplary embodiment.

(B) According to the first exemplary embodiment, the respective concealing image formations have been individually discussed. However, the plurality of concealing image formation examples may be combined.

(C) According to the respective exemplary embodiments discussed above, the PC and the monitor are separate devices. However, the PC and the monitor may be integrally formed.

(D) According to the respective exemplary embodiments discussed above, the glasses are used as an example of the optical device. However, the optical device is not limited to glasses but may be other devices as long as a normal image and a concealing image can be optically divided. For example, a sheet inserted between the monitor and the eyes of the user may be used.

What is claimed is:

1. A display concealing system comprising:
- a display unit configured to display an image;
- an image forming unit configured to form an image to be displayed on the display unit; and
- an optical device configured to transmit or cut off the image to be displayed on the display unit, wherein
- the image forming unit forms a normal image and a concealing image, and sends image data on the normal image and the concealing image to the display unit such that the normal image and the concealing image are synthesized,
- the optical device transmits the normal image, and cuts off the concealing image, and
- the concealing image is an image that includes reversing sections formed by dividing the normal image at least horizontally or vertically such that each of the reversing sections is formed of a predetermined number of pixels in a state where an array of the pixels is reversed.

2. The display concealing system according to claim 1, wherein the image forming unit sends the image data to the display unit such that the normal image and the concealing image are temporally synthesized.

3. The display concealing system according to claim 1, wherein
- the image forming unit further forms a second concealing image which is an image formed by horizontally or vertically shifting a display position of the concealing image by a predetermined number of pixels,
- the image forming unit sends image data on the normal image, the concealing image, and the second concealing image to the display unit such that the normal image, the concealing image, and the second concealing image are synthesized, and
- the optical device transmits the normal image, and cuts off the concealing image and the second concealing image.

4. The display concealing system according to claim 1, wherein
- the image forming unit detects whether characters included in the normal image are written vertically or horizontally,
- when the characters are written horizontally, the image forming unit forms the concealing image by using an image that includes reversing sections formed by horizontally dividing the normal image such that each of the reversing sections formed of a predetermined number of pixels in a state where the array of the pixels is reversed, and when the characters are written vertically, the image forming unit forms the concealing image by using an image that includes reversing sections formed by vertically dividing the normal image such that each of a predetermined number of pixels in a state where the array of the pixels is reversed.

5. The display concealing system according to claim 1, wherein the concealing image is an image where images are replaced with each other for every plural reversing sections.

6. The display concealing system according to claim 1, wherein the image forming unit detects edge portions of the normal image, estimates a size of characters included in the normal image based on distribution of the edge portions, and forms the concealing image by varying the number of pixels within the reversing sections in accordance with the size of the characters.

7. The display concealing system according to claim 2, wherein the image forming unit further forms a pattern image including patterns having particular frequency components, and sends image data on the normal image, the concealing image, and the pattern image to the display unit such that the normal image, the concealing image, and the pattern image are temporally synthesized.

8. The display concealing system according to claim 7, wherein the image forming unit detects edge portions of the normal image, and varies frequency components of the patterns in accordance with a frequency of an area including characters included in the normal image based on distribution of the edge portions to form the pattern image.

9. The display concealing system according to claim 1, wherein the image forming unit sends the image data to the display unit such that the normal image and the concealing image are spatially synthesized.

* * * * *